United States Patent Office 3,272,759
Patented Sept. 13, 1966

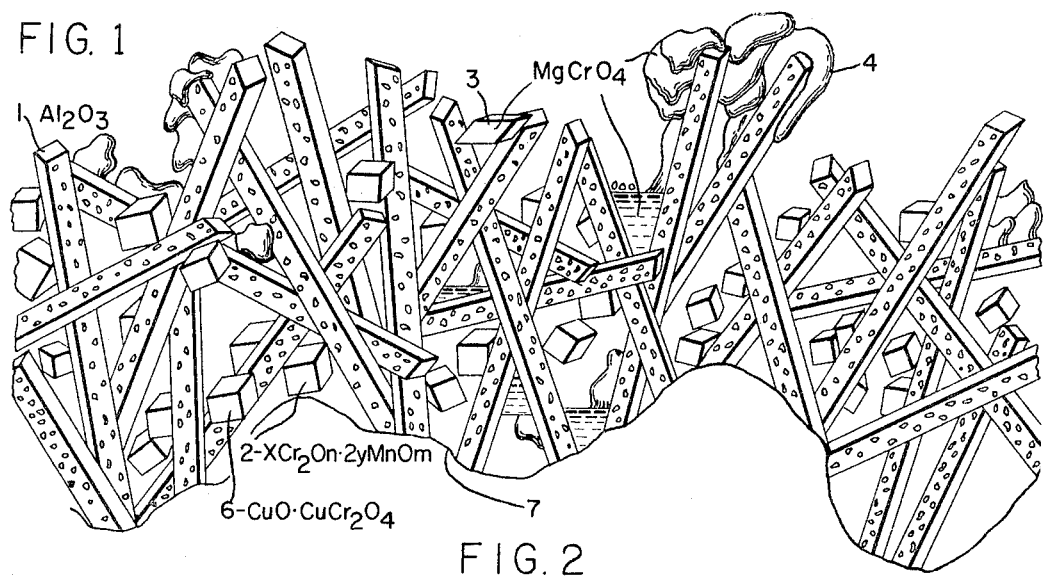
FIG. 1
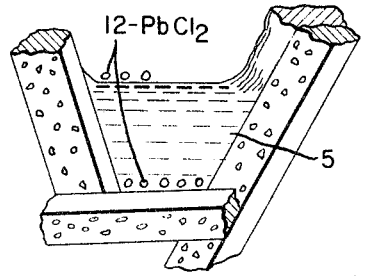
FIG. 4 — $CuO \cdot CuCr_2O_4$
FIG. 2
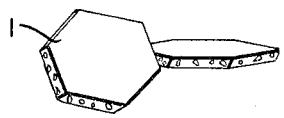
FIG. 3 — $Al_2O_3$
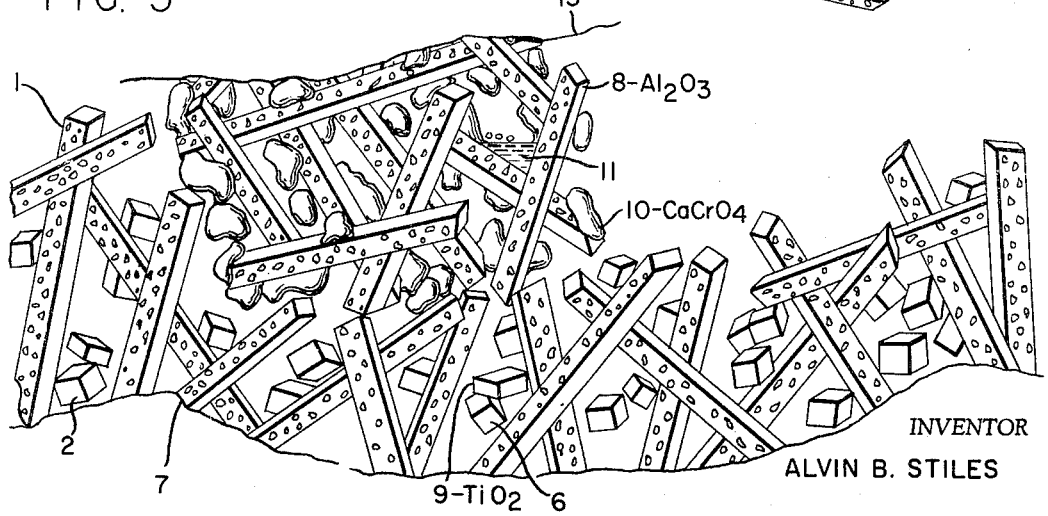
FIG. 5
INVENTOR
ALVIN B. STILES
BY Albert B. Griggs
ATTORNEY

3,272,759
CATALYST COMPOSITION COMPRISING MANGANO-CHROMIA-MANGANITE AND A CHROMATE
Alvin B. Stiles, Charleston, W. Va., assignor to E. I. du Pont de Nemours and Company, Wilmington, Del., a corporation of Delaware
Filed June 9, 1961, Ser. No. 115,970
1 Claim. (Cl. 252—465)

The present application is a continuation-in-part of U.S. application Serial No. 59,392, filed September 29, 1960, now abandoned.

This invention relates to the treatment of automobile exhaust gases which contain such products as nitrogen oxides, carbon monoxide, and hydrocarbons and which additionally contain the products of combustion of alkyl lead anti-knock compounds. The invention is more particularly directed to mangano-chromia-manganite catalysts the particles of which are contiguous to a chromate selected from the group consisting of alkali metal and alkaline earth metal chromates and to the use of such products for the catalytic conversion of the components of the combustion of leaded fuels in automobiles.

In the drawings:

FIGURE 1 is an artist's conception of the mode of contiguous association of materials in the catalysts of the invention, FIGURE 2 illustrates in more detail a section in dotted lines in FIGURE 1 showing what may happen when lead compounds are contacted with the catalytic systems of the invention, FIGURE 3 shows monoclinic crystals of alumina as pseudohexagonal crystals, FIGURE 4 shows the copper chromite crystallites in greater detail, and FIGURE 5 shows a modified embodiment of the invention in which the chromates are present as discrete contiguous particles.

Mangano - chromia - manganites are described and claimed as catalysts for the treatment of automobile exhaust gases in the following patent applications: Howk & Stiles, U.S. Ser. No 109,483, filed May 19, 1961, now Patent No. 3,216,954; Howk & Stiles, U.S. Ser. No. 59,263, filed September 29, 1960.

The mangano-chromia-manganite catalysts as described are exceedingly effective for the treatment of automobile exhaust gases. They are characterized by low temperature light-off, long life, and comparatively low cost. The catalysts work best however with fuel which does not contain much lead and with leaded fuels give good results but the activity of the catalysts falls off during use.

According to the present invention the mangano-chromia-manganite catalysts of the above tabulated cases are protected from the products of combustion of leaded gasolines by the incorporation of a chromate. The addition of a chromate according to the invention surprisingly not only protects the catalyst against leaded compounds so that they do not lose activity, but at least in early stages, say for the first five to fifteen thousand miles, catalytic activity actually increases as lead is assimilated into the catalyst. The increase in activity is particularly notable for the olefinic and the carbon monoxide components of the exhaust gases.

Before proceeding to a detailed description of the invention, reference should be had to FIGURE 1 for a general description of the catalyst systems of the invention.

In FIGURE 1 there is shown at 1 the alumina of a typical refractory suport. This is illustrated as monoclinic crystals of the hydrate. Electronmicrographs of alumina of the type here employed show that these can be more accurately represented as monoclinic crystals which are pseudohexagonal crystals as illustrated in FIGURE 3. It is noted that the holes showing at 1 in FIGURE 1 and at the edges of the hexagonal crystals in FIGURE 3 represent fissures from which water has evolved.

Mangano-chromia-manganite is illustrated at 2 of FIGURE 1 as a cube. A typical chromate according to the invention, magnesium chromate, is illustrated as a rhombohedral crystal at 3. As will be noted, the magnesium chromate is also illustrated as an amorphous particle at 4 and as a liquid pool at 5. A co-catalyst, copper chromite, is illustrated as a cubic crystal at 6 and is perhaps more accurately represented in FIGURE 4 in which the CuO is shown as small appended crystallites upon a copper chromite cube.

As will be noted later, it is important that the chromate particles be associated with the catalyst particles in such a manner as to be contiguous but is preferred that they not be intermixed as by coprecipitation though this can be done.

In the system as illustrated in FIGURES 1 and 2 there will be seen a pool of the magnesium chromate shown at 5. It is believed that the activity of catalysts of the invention in the presence of lead compounds arises from the fact that the magnesium chromate becomes molten at temperatures encountered on the catalyst support surface and lead components illustrated at 12 by PbCl$_2$ gather upon the liquid and then gravitate downward as shown in FIGURE 2. They are thus sequestered with respect to the mangano-chromia-manganite. At the same time there may be some lead chromate formed which may add activity.

It will be understood that while this explanation of function is believed to account for the data and the facts now available, it may be that some other explanation is equally consistent. It is possible, for example, that the lead compounds of whatever nature are reacted with the chromate without substantial fusion.

THE MANGANO-CHROMIA-MANGANITE CATALYSTS

The mangano-chromia-manganite catalysts to be used according to the invention are described and claimed as such and with co-catalysts, interspersants, and supports in our co-pending applications above mentioned and reference can be had to such applications for further details. A general description should be sufficient here.

The mangano-chromia-manganites have the following empirical chemical composition:

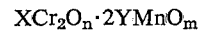

$$XCr_2O_n \cdot 2YMnO_m$$

in which $n$ can be 2, 3, and 6 and $m$ can be 1, 1.33, 1.5, 2, and 2.5. The Mn:Cr weight ratio can vary from 3:0.5 to 3:30. The atomic ratio, that of Y:X, is substantially the same and thus when Y equals 3, X can equal 0.5 to 30.

A mangano-chromia-manganite can be prepared having a ratio of Mn:Cr of 3:2 according to methods of Lazier U.S. Patent 1,746,782 and 1,964,001 and Wortz U.S. Patent 2,108,156. In these and other prior suggestions of manganese chromites it is proposed that equimolecular amounts of the manganese compound and the chromium compound be used which in aqueous solutions results in a product having a ratio of 3:2 because a third of the chromium is not precipitated and is washed away.

The mangano-chromia-manganites can be prepared by procedures which are described in detail in the Howk and Stiles applications above mentioned. Generally, it can be said that they are prepared by reacting appropriate salts of manganese and chromium in aqueous solution. Thus manganese nitrate and chromic acid anhydride are dissolved in water and ammonia is added to make a precipitate. The products of high manganese ratio can be prepared by adjusting the amounts of components, but a high chromium product can be made when a hexavalent chromium salt is used as a chromium source only by adding further chromium compound, such as ammonium chromate, to the precipitate thus prepared after filtration. Alternatively the appropriate with chromium nitrate can be precipitated or fused together to give mangano-chromia-maganites of the desired Mn:Cr ratio.

CO-CATALYST

A co-catalyst can be included with the mangano-chromia-manganite and there can be used, for example, such co-catalysts as those described in Patent No. 1,964,001. Thus one of the following can be added as the carbonate or can be added as a basic chromate or oxide:

| | |
|---|---|
| copper | cadmium |
| nickel | cobalt |
| zinc | tin |
| iron | bismuth |

The co-catalysts can, of course, be added as other compounds depending upon the specific treatment and processing conditions used.

The weight ratio of co-catalyst:mangano-chromia-manganite can vary greatly and can range from, say, 10:1 to 1:10. About 1:1 is preferred.

INTERSPERSANTS

It is often desirable to add an interspersant to the catalyst aggregate as described in the above mentioned Howk and Stiles applications. The interspersants are refractories which have a melting point about 1000° C. and more preferably above 1600° C. The crystallite size of the refractory should be such that its crystallites keep the crystallites of the mangano-chromia-manganite apart. The refractory crystallites serve a similar function with crystallites of co-catalysts which are present.

The interspersants which can be used include such water-soluble precipitates as:

(1) aluminum oxide and hydroxide
(2) titania
(3) thoria
(4) ceria
(5) chromia
(6) magnesia
(7) calcium oxide and hydroxide
(8) barium oxide and hydroxide
(9) strontium oxide
(10) zinc oxide
(11) manganese oxide
(12) silica
(13) beryllia
(14) zirconia
(15) lanthana
(16) hafnia Aluminum hydroxide, which is present as oxide in the final product, is preferred. Manganese oxide and chromia are listed as interspersants to be added in amounts exceeeding those which would be present in the mangano-chromia-manganite of the ratios described.

It is to be noted that the interspersants can be added in the first precipitation or formation of the catalyst aggregate and a second interspersant can be added after the catalyst aggregate has been formed and especially after it has been heat-treated or calcined. The interspersants can be heated-decomposable products or they can be introduced in the form of sols or dispersions.

The amount of the interspersants can be widely varied and the total of the first interspersants can run from, say, 5 to 75% based upon the weight of mangano-chromia-manganite plus a co-catalyst if there is one. A second interspersant can range in amount from 0.5 up to 50% or even more by weight of the weight of the catalyst aggregate to which it is added.

Further details of the introduction of co-catalysts and interspersants can be found in the Howk and Stiles applications previously mentioned.

THE ALKALI CHROMATE

According to the present invention a mangano-chromia-manganite catalyst is modified by associating particles of an alkali metal or an alkaline earth metal chromate in a contiguous relation to the particles of catalyst. When reference is made herein to chromates this will ordinarily refer to both chromates and bichromates in accordance with customary chemical terminology.

The alkali metal and alkaline earth metal chromates include lithium, potassium, and sodium chromates and bichromates, calcium, barium, strontium, and magnesium chromates and bichromates.

The amount of the chromate to use can be widely varied because if too much is used it is merely wasteful and if too little is used the catalyst is still effective but does not obtain the full benefits of the invention. Generally it will be found satisfactory to use a proportion of the chromate to the mangano-chromia-manganite by weight of 10:1 to 0.1:1. The motst preferred proportions are nearer the lower end of the range using amounts of chromate to catalyst in the vicinity of 1:1.

The mangano-chromia-manganite and the alkali metal or alkaline earth metal chromate can be mixed as powders and pilled, tableted or pelleted.

Precipitates of the mangano-chromia-manganite and of the alkali metal and alkaline earth metal chromates can be separately prepared and then brought together and spray dried simultaneously.

A contiguous relation between the particles of catalyst and chromate can best be obtained and a catalyst of high effectiveness and relatively low cost can be made by applying the catalyst and chromate to a refractory support. First one and then the other can be applied to the support. The mangano-chromia-manganite catalyst can also be formed in situ on the support as will be illustrated hereinafter.

As will be illustrated in the examples the chromate can be coprecipitated with the catlyst. This is a less preferred embodiment of the invention. It is to be noted that in catalysts of the invention which contain a mangano-chromia-manganite and a chromate there will be more or less inter-action between the manganese and the chromate.

As shown in FIGURE 5 the chromate can be applied, or mixed, with the mangano-chromia-manganite catalyst as discrete particles or aggregates of a number of chromate crystallites. Thus a finely ground chromate can be applied to the catalyst. As shown in FIGURE 5 a supported mangano-chromia-manganite catalyst is indicated at 1 and 2. A discrete chromate particle is shown in contact with the catalyst. This is made up of chromate particles 10, and 11 combined with alumina 8.

Alternatively there can be used any of a wide variety of materials which are inert and relatively infusible by mixing these with the chromate. Particles thus can be made which are somewhat less fusible than the chromate particles themselves. Finely divided silica, silica aerogels, and clays such as bentonite can be used in addition to other finely divided supports named below.

The discrete particles of chromate whether as an aggregate or as groups of crystallites can range in size down to the size of a single crystallite or two up to such a size that the particles will not form a stable bond between the catalyst proper and the discrete particle after the moderate calcination to which the catalyst is normally subjected. This size varies somewhat with the melting point of the chromate, the calcination temperature and other variables but generally the particles should be less than 25 microns in greatest dimension. In preparing discrete particles of chromates with suitable supports and inerts the amount of the chromate can range from 5 up to 100% though for practical reasons it will ordinarily be preferred if using a support to use about 25 to 75% of a chromate by weight based upon the total weight of the particles.

SUPPORTS

Supports suitable for use according to the present invention include various refractory bodies customarily used for this purpose in the art. There can be used for example:

(1) porous ceramic spheres, tablets, or rings which have a softening or melting point in excess of 1200° C.
(2) etched nickel, Nichrome, and Inconel wire
(3) alundum
(4) pumice
(5) diaspore
(6) bauxite
(7) periclase
(8) zirconia
(9) titania
(10) diatomaceous earth
(11) calcium sulfate
(12) barium oxide
(13) calcium oxide
(14) activated alumina granules.

The preferred refractory supports are:
  bauxite
  zirconia
  titania
  activated alumina.

It is preferred that the surface area be at least 10 m.$^2$/g. with pore dimensions such that 40% are less than 200 Angstroms. It is even more preferred that the surface area be at least 80 m.$^2$/g. with pore dimensions of at least 60% less than 200 Angstroms. Mangano-chromia-manganite catalysts employing such preferred supports are described and claimed in U.S. application Serial No. 109,483, filed May 19, 1961, now Patent No. 3,216,954. The catalyst support can be washed with water or with weak acids followed by washing with water as covered in a copending application of the assignee of the present case, Gilby U.S. application Serial No. 108,763, filed May 9, 1961, and now abandoned.

The amount of catalyst applied to a support can be widely varied in accordance with usual practices but ordinarily will run from 1 to about 20% by weight based upon the weight of refractory. Less catalyst does not ordinarily give adequate activity and more catalyst is wasteful.

The catalyst containing the alkali metal chromate or bichromate whether tableted or supported as described can be calcined, if desired, at a temperature which does not go so high as to result in sintering of the catalyst components including the chromate. Temperatures from about 250 to 800° C. will be satisfactory and the times can run from a few minutes up to 30 minutes or an hour. Such calcination will be particularly desirable if there are heat-decomposable components in the catalyst.

In order that the invention may be better understood reference should be had to the following illustrative examples.

Example 1

(1) Dissolve 165 pounds, 3 pound moles, of metallic manganese as the nitrate in 750 gallons of water. That is to say, manganese nitrate is used (containing 165 pounds Mn) in amounts of 3 pound moles.

(2) Dissolve also in the same solution containing the manganese nitrate 300 pounds, 3 pound moles, of chromic acid anhydride ($C_rO_3$).

(3) Adjust the volume to 800 gallons and the temperature to 35° C.

(4) Agitate the solution vigorously while adding vaporized anhydrous ammonia through a diffusion sparger at a rate of two pounds per minute until the precipitation is complete. Further addition of ammonia produces no further precipitate.

(5) Agitate the slurry for one hour then filter in a plate and frame press. Wash the filter cake in situ to remove dissolved salts.

(6) Dry in thin layers at 125°–150° C. for 16 hours.

(7) After drying, calcine the catalyst at 400° C. for three hours after reaching this temperature. Manganoshromia-manganites thus prepared had a crystallite size of 50 Angstroms or less.

(8) Knead 100 pounds of material prepared as above with 65 pounds of water in which there is dissolved 10 pounds of magnesium chromate.

(9) Dry, pulverize, mix with graphite, and pill.

(10) Heat the pellets thus obtained at 400° C. for three hours. The catalyst pellets thus prepared can be used for the treatment of automobile exhaust gases according to the invention.

Example 2

A preferred catalyst of the invention as shown in FIGURE 1 was prepared as follows:

(1) 250 parts by weight of 4 to 8 mesh activated alumina having a surface area of 80 m.$^2$/g. with pore dimensions of at least 60% being less than 200 Angstroms is separately weighed into a container.

(2) The activated alumina is immersed in a solution at 85° C., the solution containing 25 parts by weight of magnesium chromate and 15 parts by weight of aluminum nitrate, $Al(NO_3)_3 \cdot 9H_2O$, in 500 parts by weight of water.

(3) After 20 minutes of agitation in the liquid the granules are removed, drained of excess liquid and are then calcined at 400° C. for 2 hours after this temperature is reached.

(4) The granules are next immersed in a solution containing 500 parts by weight of water in which is dissolved 20 parts by weight of chromium, 6 parts by weight of manganese, and 6 parts by weight of copper, computed as the weight of metal but all present as nitrates. The granules are agitated for twenty minutes and removed and drained.

(5) The drained particles are calcined at 400° C. for two hours.

A catalyst as thus prepared is illustrated in FIGURE 1 of the drawings. The activated alumina serves as the support 1. Upon the support there is distributed the mangano-chromia-manganite catalyst shown as cubes in the drawing at 2. This is formed in situ by reaction of chromium and manganese nitrates in situ upon calcination. The alumina which is added together with the magnesium chromate serves as an interspersant for the mangano-chroma-manganite and since it is indistinguishable in crystalline form from the support it is also represented by the alumina shown at 1 in the drawing. The copper chromite co-catalyst is shown in the drawing at 6 as cubic in form and in FIGURE 4. The magnesium chromate employed according to the invention is illustrated in the drawing as a rhombohedral crystal 3 but it more often exists in amorphous form as shown at a number of places in the drawing at 4. In operation of the catalyst it is believed that the magnesium chromate becomes liquid at especially hot areas as shown at 5 in FIGURE 2.

The catalyst as prepared is effective for treatment of automobile exhaust resulting from burning leaded fuels. These exhaust gases normally contain nitrogen oxides, carbon monoxide, unburned hydrocarbons, and products of combustion of alkyl lead anti-knock agents. Ordinarily there are also halides present with the anti-knock agents. The lead compounds are illustrated in the drawing by $PbCl_2$ but actually include a wide variety of species including such compounds as lead bromides, lead oxyhalides, and various other complex lead compounds. The catalyst effectively converts the carbon monoxide to carbon dioxide and converts the hydrocarbons to carbon dioxide water vapor. The nitrogen oxides are in part reduced to nitrogen. The lead compounds are in part removed but part pass through the catalyst unchanged.

Catalysts can be prepared as shown above replacing the copper co-catalyst with nickel, zinc, iron, cadmium, cobalt, tin, or bismuth or mixtures of these with each other and with copper as their nitrates, chromates, or carbonates using in each instance an amount of metal as shown above. In using the carbonates which are rather insoluble, a dispersion of finely divided powder should be used. Instead of using the metal chromates the basic chromates can similarly be used. These revert in each instance to chromite on calcining as the nitrate and carbonate convert to the oxides. The catalysts thus prepared are effective for treatment of automobile exhaust gases.

*Example 3*

(1) 250 parts by weight of activated bauxite 4 to 8 mesh size is immersed in a solution of 25 parts by weight of calcium chromate in 500 parts by weight of water. The granules are agitated for 20 minutes and then removed.

(2) The granules are calcined at 400° C. for 2 hours, which treatment does not chemically modify the calcium chromate as it chemically modifies compounds in certain other of the examples but merely tends to distribute it over the surface more uniformly by melting or sintering.

(3) The granules are immersed in a solution at 95° C. containing 5 parts by weight of chromium, 9 parts by weight of manganese, 1 part by weight of nickel, 1 part by weight of copper, and 8 parts by weight of magnesium, all computed as the metal but present as nitrates.

(4) The granules are agitated for 20 minutes and then removed from the solution.

It is noted that in this and in other examples the granules pick up between about 35 and 40%, more or less, of the chemicals in the solution depending upon the particular support used and the concentration of the solution. The final ratio of chemicals will ordinarily be approximately the same as in the solution. Thus in the present example the ratio of chromate to mangano-chromia-manganite is about 1:1.

(5) The granules are calcined at 400° C. for 2 hours which forms the mangano-chromia-manganite, oxides and chromites and magnesium oxide. The magnesium oxide serves as an interspersant.

The catalyst as thus prepared is effective for treatment of the exhaust gases from an automobile burning leaded fuels.

Catalysts can be prepared as just described but instead of using magnesium nitrate can use such heat-decomposable compounds as aluminum, thorium, cerium, chromium, magnesium, calcium, barium, strontium, zinc, manganese, beryllium, zirconium, lanthanum, or hafnium nitrates or titanium oxylate or ethyl silicate. The amount in each instance is such that the weight of metals will be the same as in the example shown. It is to be noted that of course mixtures of any of the above, including the magnesium, can be used.

*Example 4*

(1) 30 parts by weight of Nichrome IV in the form of wire 0.008 of an inch in diameter and one inch long is etched by immersion in a bath comprising 400 parts by weight of molten $KNO_3$ and 200 parts by weight of molten KOH at 400° C.

(2) After 30 minutes the etched wire is removed and washed with distilled water until the alkali is removed.

(3) The etched Nichrome is immersed in a molten bath of 44 parts by weight of strontium as the nitrate and 50 parts by weight of $CrO_3$. The coated etched wire is removed from the molten bath, then is calcined at 400° C. for one hour.

The etched and coated Nichrome is next immersed for 15 minutes in a molten mixture of 9 parts by weight of manganese, 90 parts by weight of chromium and 10 parts by weight of thorium as the nitrates at 150° C.

The etched and coated wire is finally calcined at 400° C. for one hour. This material was suitable as a catalyst for the abatement of fumes in the exhaust from automobile engines using leaded gasoline.

*Examples 5 through 10*

Instead of the strontium chromate as produced and used in step 3 of Example 4, an equal weight of the below-tabulated chromates is used to produce an automobile exhaust gas catalyst as shown in Example 4:

Example 5: Lithium chromate
Example 6: Potassium chromate, or potassium dichromate
Example 7: Sodium chromate
Example 8: Calcium chromate or calcium dichromate
Example 9: Barium chromate or barium dichromate
Example 10: Magnesium chromate or magnesium dichromate

*Example 11*

(1) 250 parts by weight of zirconia in the form of 4 to 8 mesh granules and having a surface area of 2 meters squared per gram and having pore dimensions such that more than 40% are less than 600 A. in diameter, is immersed in a molten mixture comprising 115 parts by weight of barium nitrate and 50 parts by weight of $CrO_3$ at 150° C. for 15 minutes.

(2) The impregnated granules are removed from the molten bath, then calcined at 400° C. for one hour.

(3) The impregnated granules are next coated with a mangano-chrome manganite powder separately prepared by precipitating from a solution comprising 16.5 parts by weight of manganese as the nitrate and five parts by weight of $CrO_3$ plus 10 parts by weight of alumina hydrate in 500 parts by weight of water, a manganese-chromium-aluminum hydrate precipitate, using sufficient aqua ammonia to effect complete precipitation. After the manganese-chromium-alumina precipitate is filtered, dried, and calcined at 400° C. to produce a finely divided powder, it is applied to the granules by spraying it as a 15% slurry in water. In this step sufficient mangano-chrome manganite was added to be equal in weight to the barium chromate previously applied.

(4) The granules are next calcined at 400° C. for one hour. After this treatment they were suitable for catalyzing the oxidation of combustibles in the exhaust from automotive engines using leaded gasoline.

*Example 12*

(1) A solution is prepared of 16.5 parts by weight of manganese as the nitrate, 30 parts by weight of $CrO_3$, 3.1 parts by weight of copper as the nitrate and 2.8 parts by weight of iron as the nitrate in 500 parts by weight of distilled water in which is also slurried 20 parts by weight of titanium dioxide, pigment grade.

(2) The solution is heated to 30° C. and sufficient ammonium hydroxide is added to completely precipitate the manganese, chromium, copper, and iron along with the titania. Completeness of precipitation is determined by examining a sample of the filtrate to determine that no further precipitate is formed when more ammonia is added.

(3) The precipitate is filtered, dried and calcined for two hours at 400° C.

(4) 100 parts by weight of the powder obtained from Item 3 is kneaded witr a slurry-solution of 100 parts by weight of barium chromate and 15 parts by weight of aluminum nitrate in sufficient water to make a thick paste with the dry powder.

(5) The uniformly kneaded paste is dried, calcined at 400° C. for one hour then is either crushed and screened to use in granular form or is extruded and cut into cylinders approximately ⅛″ x ⅛″ or pilled in a pharmaceutical-type pilling machine to right cylinders approximately ⅛″ x ⅛″.

(6) The granules, pills or pellets as obtained in Item 5 are finally calcined in air at 450° C. for two hours.

The catalyst as prepared is suitable for the abatement of automotive exhaust fumes when leaded gasoline was used.

*Example 13*

(1) 250 parts by weight of periclase in the form of porous spheres is immersed in a molten mixture comprising 184 parts by weight of magnesium nitrate and 100 parts by weight of chromic acid anhydride and 26.5 parts by weight of aluminum oxide as the nitrate.

(2) The impregnated granules of Item 1 are removed and drained after Item 1 and are calcined at 400° C. for one hour.

(3) The impregnated periclase is immersed in a molten bath containing 110 parts by weight of manganese as a nitrate, 130 parts by weight of chromium as the nitrate, 57 parts by weight of cadmium as the nitrate and 13.3 parts by weight of magnesium oxide as the nitrate at 150° C.

(4) The impregnated spheres are removed from the molten bath then are calcined at 400° C. for one hour.

(5) The calcined spheres are suitable as catalyst for the oxidation of combustibles in automotive engine exhausts in which the fuel is leaded.

*Example 14*

(1) 250 parts by weight of activated alumina 4–8 mesh is immersed in a solution comprising 25 parts by weight of $MgCrO_4$ in 500 parts by weight of distilled water at 90° C.

(2) The moist granules are removed from the solution and are dried and finally calcined at 400° C. for one hour.

(3) The calcined granules are next immersed for 15 minutes in a molten mixture at 150° C. of 55 parts by weight of manganese, 312 parts by weight of chromium, 63 parts by weight of copper and 133 parts by weight of aluminum oxide all as nitrates. They are then removed and drained of excess salts.

(4) The coated granules are calcined at 400° C. for one hour.

(5) The calcined granules are immersed in a solution comprising 13.3 parts per weight of thorium oxide as nitrate in 500 parts by weight of water. After a 15-minute period the granules are removed from the thorium nitrate solution then dried and calcined at 400° C. for one hour.

*Example 15*

(1) 30 parts by weight of Nichrome wire .008 of an inch in diameter and one inch long is etched according to the procedure described in Example 4.

(2) The etched Nichrome wire is immersed in a molten mixture composed of 55 parts by weight of manganese, 190 parts by weight of chromium, 63 parts by weight of copper, and 26 parts by weight of thorium oxide all as the nitrates. The mixture is heated to 150° C. and immersion is for a 15-minute period.

(3) The coated wire filaments are calcined at 400° C. for one hour.

(4) The calcined coated filaments are placed in a device similar to that used for coating pharmaceutical pills. The granules are coated with an aqueous solution containing 3 parts by weight of magnesium chromate. The entire quantity of magnesium chromate is dried onto the wire filaments.

(5) They are next calcined at 400° C. for one hour. This catalyst is useful for the abatement of fumes from automobiles powered with leaded fuel.

*Example 16*

(1) 250 parts by weight of diaspore as 8 to 14 mesh granules is immersed in a solution comprising 5.5 parts by weight of manganese, 6.3 parts by weight of copper and 3.2 parts by weight of $Ce_2O_3$ as the nitrates and 18.9 parts by weight of chromium as $CrO_3$ in 500 parts by weight of distilled water.

(2) The moist granules after having been removed from the solution of Item 1 are placed in a closed tube in which $NH_3$ enters one end and is exhauted from the other.

(3) $NH_3$ was passed at 30° to 40° C. over and through the moist granules until $NH_3$ appears at the exit end.

(4) The granules are calcined at 400° C. for one hour.

(5) The calcined granules are coated with an aqueous slurry containing 3 parts by weight of $BaCrO_4$ by the method and procedure used in Item 4 of Example 15.

(6) Finally, the granules are heat treated at 500° C. for one hour.

*Examples 17 through 21*

In the following examples a procedure is followed as in Example 16, except that instead of the diaspore used in Step 1, the tabulated support was used:

Example 17: 250 parts by weight of pumice
Example 18: 250 parts by weight of 4 to 8 mesh porous titanium
Example 19: 250 parts by weight of 4 to 8 mesh diatomaceous earth
Example 20: 250 parts by weight of 4 to 8 mesh activated calcium sulfate
Example 21: 250 parts by weight of activated barium oxide.

*Example 22*

(1) 250 parts by weight of 4 to 8 mesh activated alumina, of the type described in Example 2 is coated with 5 parts by weight of barium chromate in an aqueous slurry employing a heated pill-coating device of the type used in the pharmaceutical industry.

(2) After coating, the granules are calcined at 500° C. for one hour.

(3) The calcined granules are next immersed in a solution comprising 5.5 parts by weight of manganese, 6.3 parts by weight of copper and 6.2 parts by weight of zirconium oxide all as the nitrates and 18.9 parts by weight of chromium as $CrO_3$ in 500 parts by weight of water at 90° C.

(4) The excess liquid is drained from the granules then the moist granules are placed in a closed tube in which ammonia vapor enters one end and is exhausted at the other.

(5) Ammonia is passed at 30 to 40° C. over the moist granules until $NH_3$ appears at the exhaust end.

(6) The granules are calcined at 400° C. for one hour. This catalyst, as is true of all the catalyst in previous examples, is useful for oxidation and abatement of fumes in automotive engine exhaust in which the engine burned leaded gasoline.

*Example 23*

This example follows the procedure described in Example 22 except that in Step 1, 5 parts by weight of magnesium chromate is used instead of barium chromate.

*Example 24*

Items 1 and 2 are identical to Items 1 and 2 of Example 22.

(3) Again place the coated granules in the pill-coating device and spray an aqueous solution containing 2 parts by weight of manganese, 1.1 parts by weight of copper, 2.2 parts by weight of zinc oxide, and 18.9 parts by weight of chromium all as the nitrates onto the granules in such a way that all of the salts remain on the granules and the water is expelled.

(4) Calcine at 400° C. for one hour. This catalyst is also useful for the abatement of fumes from exhausts of atuomobiles using leaded fuels.

Example 25

(1) A solution is prepared of 16.5 parts by weight of manganese as the nitrate, 30 parts by weight of $CrO_3$, and 3.1 parts by weight of copper as the nitrate and 7.7 parts by weight of barium as barium oxide in 500 parts by weight of distilled water in which is also slurried 20 parts by weight of titanium dioxide, pigment grade.

(2) The solution is heated to 30° C. and sufficient ammonium hydroxide is added to completely precipitate the manganese, chromium, copper and barium along with the titania. Completeness of precipitation is determined by examining a sample of the filtrate to determine that no further precipitate is formed when more ammonia is added.

(3) The precipitate is filtered, dried and calcined for two hours at 400° C.

(4) 100 parts by weight of the powder obtained from Item 3 is kneaded with a slurry-solution of 15 parts by weight of aluminum nitrate in sufficient water to make a thick paste with the dry powder.

(5) The uniformly kneaded paste is dried, calcined at 400° C. for one hour then is either crushed and screened to use in granular form or is extruded and cut into cylinders approximately 1/8" x 1/8" or pilled in a pharmaceutical-type pilling machine to right cylinders approximately 1/8" x 1/8".

(6) The granules, pills or pellets as obtained in Item 5 are finally calcined in air at 450° C. for two hours.

The catalyst as prepared is suitable for the abatement of automobile exhaust fumes when leaded gasoline is used.

Example 26

A catalyst in which the chromate is present as discrete particles can be prepared as follows:

SUPPORTED CATALYST PREPARATION (1) 250 parts by weight of 4–8 mesh activated alumina is immersed in a solution-slurry of 16.5 parts by weight of manganese, 6.3 parts by weight of copper, both as the nitrate, plus 30 parts by weight of $CrO_3$ and 4 parts by weight titanium dioxide as a colloidal aqueous dispersion, all in 500 parts by weight of water at 90° C.

(2) The granules after mild agitation in the liquid for 15 minutes are allowed to drain and are dried.

PREPARATION OF DISCRETE CHROMATE PARTICLES (3) 500 parts by weight of alumina hydrate, of particle size such that 100% is in the range 5 to 25 microns (as determined by eleutriation) is placed in a heated and rotated vessel.

(4) A slurry-solution containing 100 parts by weight of calcium chromate is sprayed onto the alumina hydrate and dried.

COMPOSITE CATALYST (5) 250 parts by weight of the supported catalyst is mixed with 50 parts by weight of the discrete chromate particles. These are tumbled together in a heated atmosphere at 300° C. for about 30 minutes.

The products as thus prepared are suitable for use as a catalyst for treatment of leaded automobile exhaust gases.

Instead of using alumina hydrate as shown there can instead be used fibrous alumina monohydrate having the boehmite crystal lattice, pumice, diatomaceous earth, finely divided silica or silica aerogels, or other of the supports listed above in like amounts by weight with the chromate shown above or with other of the chromates shown in this application to form discrete particles having a size not greater than 25 microns.

The catalyst as prepared in the example above using alumina as a support for both the mangano-chromia-manganite and the chromate is shown in FIGURE 5 of the drawing. The surface of the support is shown at 7 and like materials in FIGURES 1 and 5 are designated by like numerals. In the catalyst of FIGURE 5 titanium dioxide is shown at 9 as an interspersant in the form of tetragonal crystals.

In FIGURE 5, 10 and 11 refer to calcium chromate. A portion of one discrete particle is shown which is broken at 13 and the remainder of the particle is illustrated as being in contact with the catalyst surface. The portion of the particle shown represents aluminum hydrate at 8 and is illustrated further in FIGURE 3. As illustrated in the drawing there is some sintering and attachment between the discrete particle and the outer surface of the catalyst.

The claim is:

As a catalyst for the treatment of combustion gases which contain such products as nitrogen oxide, carbon monoxide and hydrocarbon and which additionally contain a lead compound; mangano-chromia-manganite containing an interspersant of similar crystallite size selected from the group consisting of oxides of aluminum, titanium, chromium, magnesium, barium, calcium and strontium and supported upon a particulate refractory and being intermixed with discrete particles of a particulate refractory upon which there is supported a chromate selected from the group consisting of alkali metal and alkaline earth metal chromates, the propotrion of chromate to mangano-chromia-manganite in the mixture being in the range of 10:1 to 0.1:1 by weight.

References Cited by the Examiner

UNITED STATES PATENTS

| | | | |
|---|---|---|---|
| 1,716,481 | 6/1929 | Bilsky | 23—2.2 |
| 2,025,140 | 12/1935 | Wenzel | 23—2.2 |
| 2,942,933 | 6/1960 | Batchelder et al. | 23—2.2 |

OTHER REFERENCES

Mellor: "A Comprehensive Treatise on Inorganic and Theoretical Chemistry," Longmans, Green and Company, New York, New York, volume 12, 1932, pages 274 and 280.

Sidgwick: "The Chemical Elements and Their Compounds," Oxford University Press, London, 1950, volume II, page 1273.

OSCAR R. VERTIZ, *Primary Examiner.*

MAURICE A. BRINDISI, BENJAMIN HENKIN,
*Examiners.*

E. C. THOMAS, *Assistant Examiner.*